(12) United States Patent
Vembu

(10) Patent No.: US 7,636,441 B2
(45) Date of Patent: Dec. 22, 2009

(54) METHOD FOR SECURE KEY EXCHANGE

(75) Inventor: Balaji Vembu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 10/756,444

(22) Filed: Jan. 12, 2004

(65) Prior Publication Data

US 2005/0154890 A1    Jul. 14, 2005

(51) Int. Cl.
*H04L 9/08* (2006.01)
*H04L 9/30* (2006.01)

(52) U.S. Cl. .................. 380/281; 380/282; 713/189; 713/193; 713/194

(58) Field of Classification Search .................. 380/30, 380/44–47, 281–285; 713/189, 193–194
See application file for complete search history.

(56) References Cited

U.S. PATENT DOCUMENTS

| | | | |
|---|---|---|---|
| 6,256,733 B1 * | 7/2001 | Thakkar et al. ............ | 713/156 |
| 6,336,121 B1 * | 1/2002 | Lyson et al. ............... | 707/201 |
| 7,142,676 B1 * | 11/2006 | Hillier et al. ............... | 380/278 |
| 2003/0163684 A1 * | 8/2003 | Fransdonk ................. | 713/153 |
| 2003/0188179 A1 * | 10/2003 | Challener et al. .......... | 713/193 |
| 2003/0194093 A1 * | 10/2003 | Evans et al. ................ | 380/282 |
| 2004/0151319 A1 * | 8/2004 | Proudler ..................... | 380/277 |

OTHER PUBLICATIONS

Scheiner, Bruce. Applied Cryptography "Protocols, Algorithms, and Source Code in C" John Wiley and Sons (1996); pp. 524-525 (portion of Chapter 22, section 7).*

* cited by examiner

*Primary Examiner*—Jung Kim
*Assistant Examiner*—Venkat Perungavoor
(74) *Attorney, Agent, or Firm*—Blakely, Sokoloff, Taylor & Zafman LLP

(57) ABSTRACT

Secure key exchange and protected content distribution between a first entity and a second entity in a processing system may be accomplished by generating, by the first entity, a first key, encrypting the first key with a public key of a third entity, and storing the encrypted first key in the third entity. The second entity generates a second key, encrypts the second key with the public key of the third entity, and stores the encrypted second key in the third entity. The third entity decrypts the encrypted first key and the encrypted second key, using the third entity's private key to obtain the first key and the second key, encrypts the first key using the second key, and stores the first key encrypted by the second key in the third entity. The second entity then obtains the first key encrypted by the second key, and decrypts, using the second key, the first key encrypted by the second key. The first key may then be used to encrypt content sent to from the second entity to the first entity.

19 Claims, 3 Drawing Sheets

METHOD FOR SECURE KEY EXCHANGE

BACKGROUND

1. Field

The present invention relates generally to computer security and, more specifically, to exchanging cryptographic keys in a processing system.

2. Description

One of the hurdles in providing protected digital content on a computing platform (such as the personal computer (PC)) is that the application program that is extracting the protected content and the graphics device that is decoding and/or displaying the content need to agree on a cryptographic key to encrypt the data exchange between them. If the content is not encrypted during transfer between the application and the graphics device, the content may be vulnerable to interception. One of the two entities cannot merely generate the key and send the key to the other entity because there is typically no "non-snoopable" secure path between the application and the graphics device.

One approach to this problem is to embed identical encryption keys in the graphics device and the application, and then use this key. This approach entirely avoids the key exchange. However, this solution is not robust because the application program may be hacked to discover the key. Another approach is to embed a private key of a public/private key pair in the graphics device and send the corresponding public key to the application. The application then uses the public key to encrypt the content and the graphics device uses the private key to decrypt the content. Alternatively, the application can generate a new symmetric session key, encrypt it with the graphic device's public key, and send it to the graphics device (hence the public-private key pair is used to enable exchange of the symmetric key). Since by definition the public key does not need to be protected from other agents, the public key can be sent to the application in the clear.

Both of these approaches require a key to be embedded in the graphics device. This increases the manufacturing cost and adds complexity to the manufacturing flow for graphics devices. A better approach is needed.

BRIEF DESCRIPTION OF THE DRAWINGS

The features and advantages of the present invention will become apparent from the following detailed description of the present invention in which.

DETAILED DESCRIPTION

An embodiment of the present invention is a method of exchanging a cryptographic key between two entities within a processing system. In one embodiment, the two entities may be an application program and a graphics device. However, embodiments of the present invention may be used with any two entities in a processing system. Embodiments of the present invention make use of a trusted platform module (TPM), which is used as a root of trust for a processing system. Every TPM contains a public/private key pair. Embodiments of the present invention leverage the TPM's key pair to facilitate the key exchange. The present invention does not require any keys to be embedded in the entities that need to agree on a common key.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
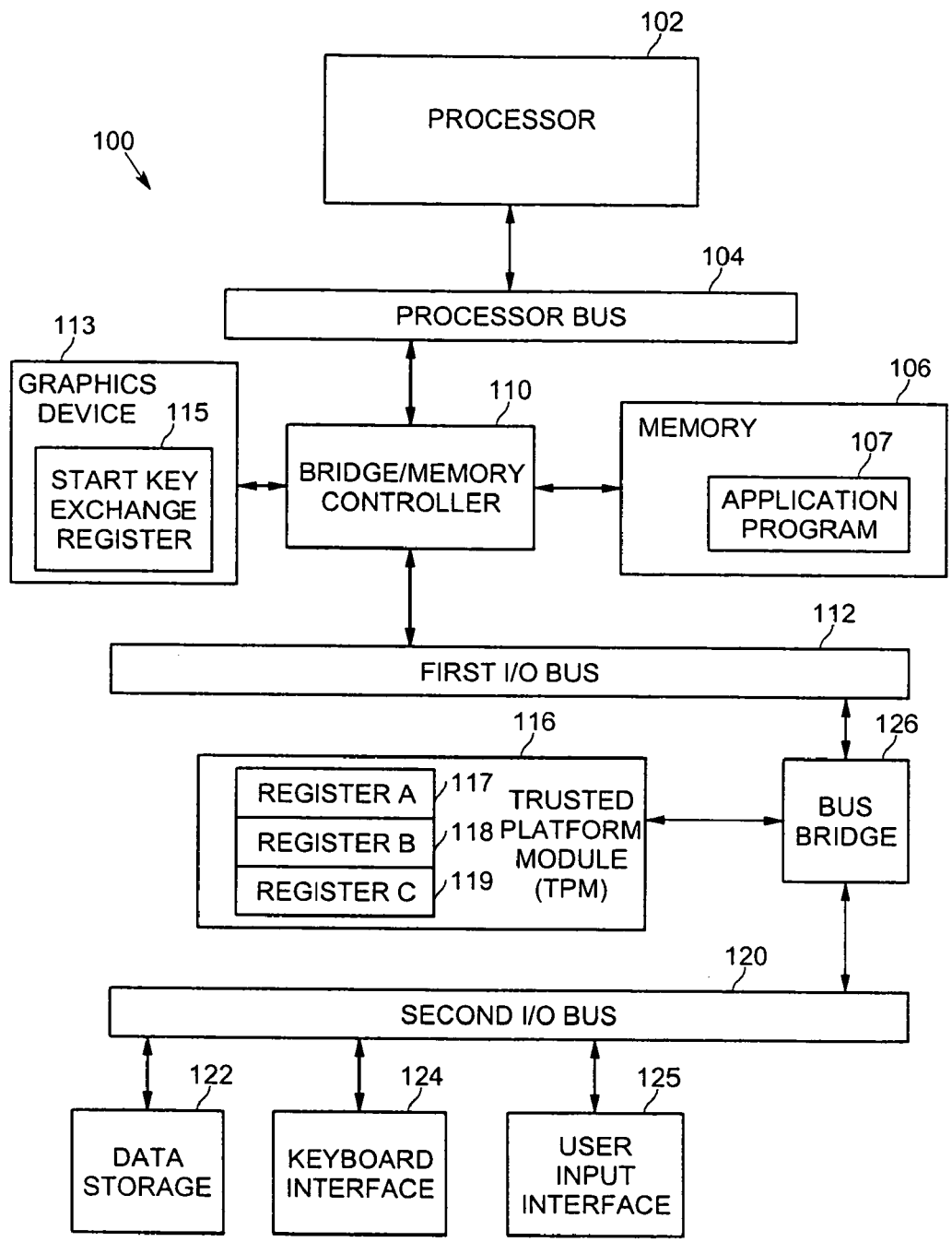
FIG. 1 is a diagram illustrating a processing system having a trusted platform module (TPM) according to an embodiment of the present invention.

An exemplary processing system for embodiments of the present invention is shown in FIG. 1, however, other systems may also be used and not all components of the processing system shown are required for the present invention. Sample system 100 may be used, for example, to execute the processing for embodiments of the present invention. Sample system 100 is representative of processing systems based on the PENTIUM® family of processors and CELERON™ processors available from Intel Corporation, although other systems (including personal computers (PCs) or servers having other processors, engineering workstations, other set-top boxes, and the like) and architectures may also be used.

FIG. 1 is a block diagram of a system 100 of one embodiment of the present invention. The system 100 includes a processor 102 that processes data signals. Processor 102 may be coupled to a processor bus 104 that transmits data signals between processor 102 and other components in the system 100. System 100 includes a memory 106. Memory 106 may store instructions and/or data represented by data signals that may be executed by processor 102. The instructions and/or data may comprise code for performing any and/or all of the techniques of the present invention. Memory 106 may also contain additional software and/or data such as at least one application program 107.

A bridge/memory controller 110 may be coupled to the processor bus 104 and memory 106. The bridge/memory controller 110 directs data signals between processor 102, memory 106, and other components in the system 100 and bridges the data signals between processor bus 104, memory 106, and a first input/output (I/O) bus 112. In this embodiment, graphics device 113 interfaces to a display device (not shown) for displaying images rendered or otherwise processed by the graphics device 113 to a user. Graphics device 113 may comprise a start key exchange register 115. The graphics device may receive data such as protected digital content from the application when the application is being executed by the processor.

First I/O bus 112 may comprise a single bus or a combination of multiple buses. First I/O bus 112 provides communication links between components in system 100.

In at least one embodiment, a trusted platform module (TPM) 116 may be coupled to bus bridge 126. A TPM comprises circuitry included within a processing system to support trusted computing. A TPM has been defined by the Trusted Computing Group (TCG) in the Trusted Computing Platform Association (TCPA) Main Specification 1.2, February 2002, and successive versions, available from the TCG. A TPM operates somewhat like a "smart card" on a motherboard of a computer system (such as a personal computer (PC)), to provide various security functions to the system. There is only one TPM per system. The TPM includes at least one public/private key pair for use in cryptographic operations, can generate anonymous key pairs for use by other entities within the system, can perform encryption and decryption operations, can sign and verify data, and can establish a root of trust for the system. The TPM is considered to be difficult to break into and affect its operations. In at least one embodiment, TPM 116 comprises at least three registers, denoted register A 117, register B 118, and register C 119, herein. Embodiments of the present invention use the TPM's key infrastructure and these three registers to perform a key exchange.

A second I/O bus 120 may comprise a single bus or a combination of multiple buses. The second I/O bus 120 provides communication links between components in system 100. A data storage device 122 may be coupled to the second I/O bus 120. A keyboard interface 124 may be coupled to the second I/O bus 120. A user input interface 125 may be coupled to the second I/O bus 120. The user input interface may be coupled to a user input device, such as a remote control, mouse, joystick, or trackball, for example, to provide input data to the system. A bus bridge 126 couples first I/O bridge 112 to second I/O bridge 120.

Embodiments of the present invention are related to the use of the system 100 as a component in a content protection and rendering system. According to one embodiment, such processing may be performed by the system 100 in response to processor 102 executing sequences of instructions in memory 106. Such instructions may be read into memory 106 from another computer-readable medium, such as data storage device 122, for example. Execution of the sequences of instructions causes processor 102 to execute secure key exchange processing for the application according to embodiments of the present invention. In an alternative embodiment, hardware circuitry may be used in place of or in combination with software instructions to implement portions of embodiments of the present invention. Thus, the present invention is not limited to any specific combination of hardware circuitry and software.

The elements of system 100 perform their conventional functions in a manner well-known in the art. In particular, data storage device 122 may be used to provide long-term storage for the executable instructions and data structures for embodiments of components of the content distribution system in accordance with the present invention, whereas memory 106 is used to store on a shorter term basis the executable instructions of embodiments of components of the content distribution system in accordance with the present invention during execution by processor 102.

Figure 2:
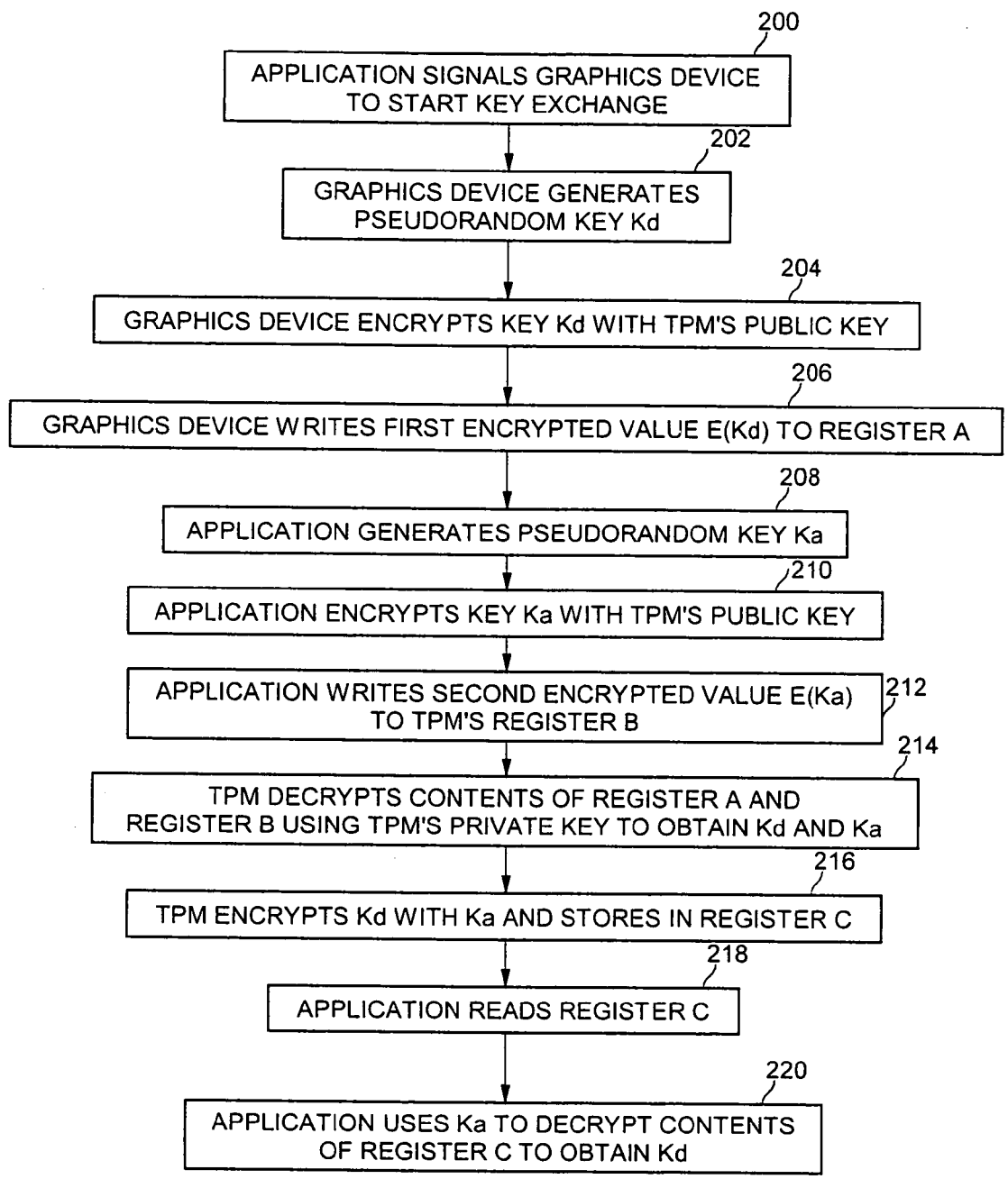
FIG. 2 is a flow diagram illustrating a process for secure key exchange according to an embodiment of the present invention.

FIG. 2 is a flow diagram illustrating a process for secure key exchange between entities in a processing system according to an embodiment of the present invention. At block 200, a first entity in the processing system, such as application program 107 for example (which in some embodiments may comprise a content player application) signals a second entity, such as graphics device 113, to start key exchange processing. The key exchange may be needed to support protected transmission of content from the first entity to the second entity. In one embodiment, the second entity comprises a hardware device (such as a graphics controller/graphics card/graphics device) having a register that, when written to, indicates a request to start key exchange processing between the hardware device and another entity in the processing system. In one embodiment, this register may be known as a start key exchange register 115, and the first entity (e.g., the application) causes the writing of a predetermined value into the start key exchange register to start key exchange processing. The writing of the start key exchange register is represented as flow 300 on FIG. 3. In other embodiments, other methods of signaling the graphics device to start the key exchange may be used.

At block 202, after detecting the writing of the start key exchange register, the graphics device generates a first pseudorandom symmetric key $K_D$ using any well known method of key generation. The TPM comprises at least one public/private key pair. The TPM's public key is known by other entities in the processing system. At block 204, the graphics device encrypts the pseudorandomly generated key $K_D$ using the TPM's public key $K_{TPM-PUB}$ according to well known methods of public key cryptography to form a first encrypted value $E(K_D, K_{TPM-PUB})$. At block 206, the graphics device sends the first encrypted value $E(K_D, K_{TPM-PUB})$ to TPM 116 and causes the writing of the first encrypted value $E(K_D, K_{TPM-PUB})$ into a first register, such as Register A 117. This action is represented as flow 302 on FIG. 3. Since the TPM's public key was used to encrypt the graphic device's key, only the TPM's corresponding private key can be used to decrypt the graphic device's key.

Next, at block 208, the application generates a second pseudorandom symmetric key $K_A$ using any well known method of key generation. At block 210, the application encrypts the pseudorandomly generated key $K_A$ using the TPM's public key $K_{TPM-PUB}$ according to well known methods of public key cryptography to form a second encrypted value $E(K_A, K_{TPM-PUB})$. At block 212, the application sends the second encrypted value $E(K_A, K_{TPM-PUB})$ to TPM 116 and causes the writing of the second encrypted value $E(K_A, K_{TPM-PUB})$ into a second register, such as Register B 118. This action is represented as flow 304 on FIG. 3. Since the TPM's public key was used to encrypt the application's key, only the TPM's corresponding private key can be used to decrypt the application's key. In one embodiment, blocks 208 to 212 may be performed concurrently with blocks 200 to 206.

At block 214, the TPM decrypts the first and second encrypted values stored in register A and register B, respectively, using the TPM's private key $K_{TPM-PRI}$. The TPM now has both the application's key $K_A$ and the graphic device's key $K_D$. Since the TPM is very difficult to access in an unauthorized way, these values are considered to be secure. Next, at block 216, the TPM encrypts the graphic device's symmetric key $K_D$ using the application's symmetric key $K_A$ and an appropriate encryption algorithm, and stores the third encrypted value $E(K_D, K_A)$ into a third register in the TPM, such as register C 119. At block 216, the application reads the contents of register C 119 from the TPM to obtain the third encrypted value $E(K_D, K_A)$. This action is represented as flow 306 in FIG. 3. The capability for the application to obtain the contents of register C from the TPM is assumed in this embodiment. At block 218, the application decrypts the contents of register C received from the TPM using the application's own key $K_A$ and a corresponding decryption algorithm to obtain $K_D$.

Figure 3:
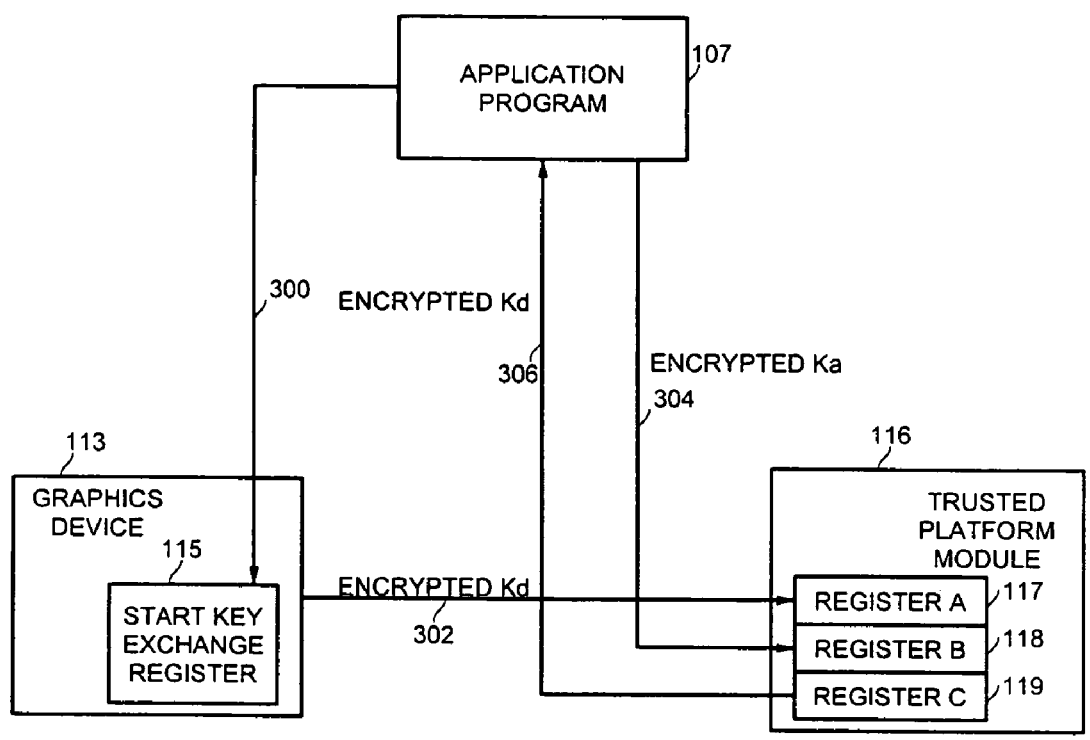
FIG. 3 is a diagram illustrating communications between an application, a graphics device and a TPM according to an embodiment of the present invention.

Since all of the data flows between entities as shown in FIG. 3 were encrypted, the data may be secure against hackers attempting to discover the keys by monitoring communications between the entities.

The graphic device's symmetric key $K_D$ may now be used by the application to encrypt content. The encrypted content may be sent by the application to the graphics device, where the encrypted content may be decrypted by the graphics device and further processed (e.g., rendered for perception by the user), since the graphics device already knows its own key $K_D$.

In one embodiment, if the graphics device needed to know the application's key $K_A$, a similar mechanism to blocks 216 to 220 may be used to transfer the application's key to the graphics device in a protected manner.

In the above embodiments, for good security the application needs to ensure that the key exchange happened with a legitimate graphics device and not a hacker's unauthorized device masquerading as the graphics device. This can be ensured by providing a private path from the graphics device to a dedicated TPM graphics processor input/output (I/O) (GPIO) pin. This path would ensure that Register A 117 would be written only with data received over the line connected to the GPIO pin to the TPM. The GPIO pin may be connected to the graphics device (e.g., an advanced graphics processor (AGP)/peripheral component interconnect (PCI) slot) using a buried line on the printed circuit board of the processing system's motherboard that is not easily detectable by a hacker. This line is also represented as flow 302 on FIG. 3.

In the absence of embedded keys in the endpoints of the exchange, if two endpoints want to agree on a common key it typically requires a fairly elaborate and complex protocol (e.g., Diffie-Hellman key exchange). One simple solution is to embed keys in the endpoints and then use the embedded key to encrypt the key that needs to be exchanged. However, embedding keys in the endpoints adds a lot of security overhead because the keys have to be protected. Additionally, embedded keys raises revocation issues for devices. If the keys need to be unique, then this adds to the manufacturing complexity and cost. In contrast, embodiments of the present invention allow a secure key exchange to take place between two entities (e.g., an application program and a graphics device) without either of them embedding any keys. The entities take advantage of the public/private key pair that is available on the platform in the TPM to perform the key exchange in a secure manner.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the portions of the present invention includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a removable storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Although the operations describe herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of secure key exchange between a first entity and a second entity using a trusted platform module (TPM) separate from the first and second entity and having a public/private key pair, the method comprising:
    generating, by the first entity, a first key, encrypting the first key with a public key of a TPM, the TPM having at least three registers, the TPM separate from the first and second entities and having a public/private key pair, and storing the encrypted first key in a first register of the TPM;
    generating, by the second entity, a second key, encrypting the second key with the public key of the TPM, and storing the encrypted second key in a second register of the TPM;
    decrypting, by the TPM, the encrypted first key stored in the first register and the encrypted second key stored in the second register, using the TPM's private key to obtain the first key and the second key;
    encrypting, by the TPM, the first key using the second key, and storing the first key encrypted by the second key in a third register of the TPM;
    obtaining, by the second entity from the third register of the TPM, the first key encrypted by the second key, and decrypting, by the second entity using the second key and a corresponding decryption algorithm, the first key encrypted by the second key.

2. The method of claim 1, further comprising encrypting content with the first key by the second entity and transferring the encrypted content from the second entity to the first entity.

3. The method of claim 1, wherein the first entity comprises a graphics device.

4. The method of claim 1, wherein the second entity comprises an application program.

5. The method of claim 1, wherein generating the first key comprises pseudorandomly generating the first key, and generating the second key comprises pseudorandomly generating the second key.

6. The method of claim 1, wherein the first key and the second key comprise symmetric keys.

7. The method of claim 1, further comprising signaling the first entity, by the second entity, to start the key exchange.

8. The method of claim 7, wherein signaling comprises storing a value in a register resident in the first entity.

9. A system for secure key exchange comprising:
    a trusted platform module (TPM) having a public/private key pair, the TPM having at least three registers;
    a first entity separate from the TPM, the first entity to generate a first key, to encrypt the first key with the public key of the TPM, and to store the encrypted first key in a first register of the TPM;
    a second entity to generate a second key, to encrypt the second key with the public key of the TPM, and to store the encrypted second key in a second register of the TPM;
    wherein the TPM decrypts the encrypted first key stored in the first register and the encrypted second key stored in the second register using the TPM's private key to obtain the first key and the second key, encrypts the first key using the second key, and stores the first key encrypted by the second key in a third register of the TPM; and
    wherein the second entity obtains the first key encrypted by the second key from the third register of the TPM, and decrypts, using the second key and a corresponding decryption algorithm, the first key encrypted by the second key.

10. The system of claim 9, wherein the first entity comprises a graphics device.

11. The system of claim 9, wherein the second entity comprises an application program.

12. The system of claim 9, wherein the TPM comprises a first register to store the encrypted first key, a second register to store the encrypted second key, and a third register to store the first key encrypted by the second key.

13. The system of claim 9, wherein the first key and the second key comprise pseudorandomly generated symmetric keys.

14. The system of claim 9, wherein the second entity encrypts content with the first key and transfers the encrypted content to the first device.

15. The system of claim 9, wherein the TPM comprises an input/output pin dedicated for use by the first entity, and the first entity is coupled to the dedicated input/output pin using a buried line on a printed circuit board.

16. A method of secure key exchange and protected content distribution between a graphics device and an application program comprising:
    pseudorandomly generating, by the graphics device, a first symmetric key, encrypting the first symmetric key with a public key of a trusted platform module (TPM), the TPM having at least three registers, the TPM being separate from the graphics device and the application program and storing the encrypted first symmetric key in a first register in the TPM;
    pseudorandomly generating, by the application program, a second symmetric key, encrypting the second symmetric key with the public key of the TPM, and storing the encrypted second symmetric key in a second register in the TPM;
    decrypting, by the TPM, the encrypted first symmetric key stored in the first register and the encrypted second symmetric key stored in the second register using the TPM's private key to obtain the first symmetric key and the second symmetric key;
    encrypting, by the TPM, the first symmetric key using the second symmetric key, and storing the first symmetric key encrypted by the second symmetric key in a third register in the TPM;
    obtaining, by the application program from the third register of the TPM, the first symmetric key encrypted by the second symmetric key, and decrypting, using the second symmetric key and a corresponding decryption algorithm, the first symmetric key encrypted by the second symmetric key; and
    encrypting content, by the application program, using the first symmetric key, and sending the encrypted content to the graphics device.

17. The method of claim 16, further comprising signaling the graphics device, by the application program, to start the key exchange.

18. The method of claim 17, wherein signaling comprises storing a value in a register resident in the graphics device.

19. The method of claim 16, further comprising, decrypting, by the graphics device, the encrypted content using the first symmetric key.

* * * * *